M. S. EVERY.
Sheep Feeding Rack.

No. 56,024.

Patented July 3, 1866.

UNITED STATES PATENT OFFICE.

M. S. EVERY, OF BRIDGEWATER, MICHIGAN.

IMPROVEMENT IN SHEEP-FEEDING RACKS.

Specification forming part of Letters Patent No. 56,024, dated July 3, 1866.

*To all whom it may concern:*

Be it known that I, M. S. EVERY, of Bridgewater, in the county of Washtenaw and State of Michigan, have invented a new and Improved Sheep-Feeding Rack; and I do hereby declare that the following is a full, clear, and exact description thereof, which will enable others skilled in the art to make and use the same, reference being had to the accompanying drawings, forming a part of this specification, in which—

Figure 1:
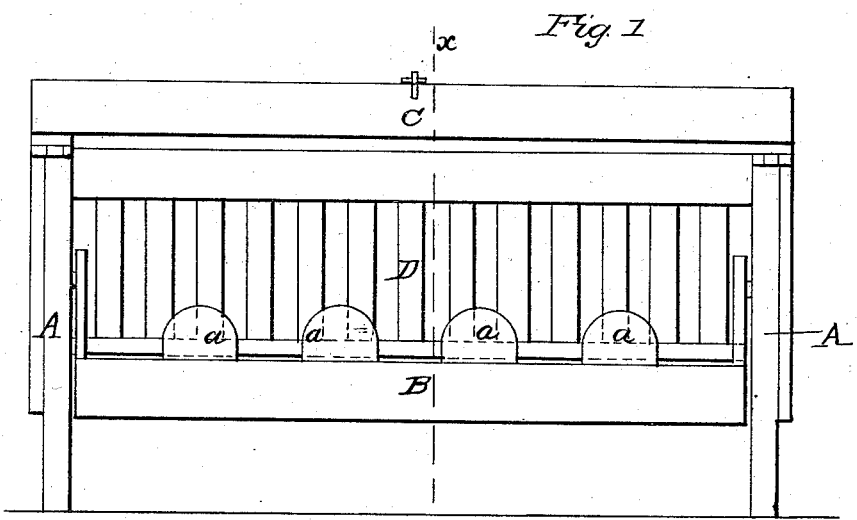
Figure 2:
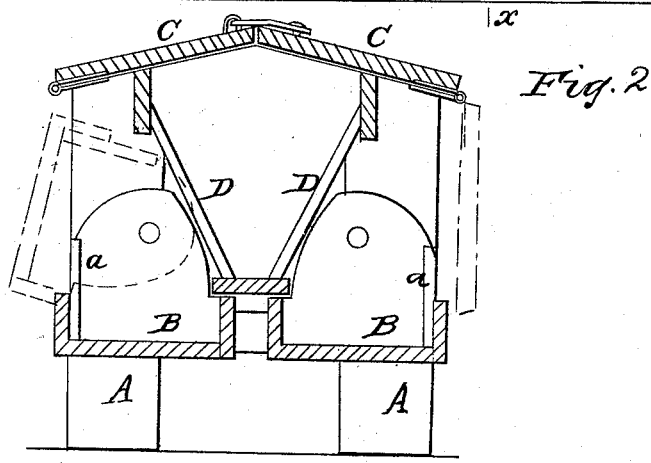

Figure 1 is a side elevation of my invention. Fig. 2 is a cross-section taken on the plane of the line x x, Fig. 1.

Similar letters of reference indicate like parts.

The object of my invention is to so construct a sheep-feeding rack that the same may be used for feeding out either hay or grain.

My invention consists in providing the rack with inclined slatted sides or ricks, through which the hay, when such is fed to the sheep, can be drawn by the sheep without waste.

It also consists in so dividing off the troughs that a certain space may be allotted to each sheep, so that the stronger animal cannot crowd away the weaker one.

A designates the frame of the device. B B are the troughs, which are pivoted in the frame at a proper height to be accessible to the sheep. These troughs have a number of partition-plates or division-walls, *a a*, arranged along them, sufficient room being left between each division-wall for the sheep to feed in.

By the employment of these division-walls the stronger sheep are prevented crowding the weaker ones, which often occurs in a degree to prevent the latter obtaining their share of the feed in the trough.

C C designate the two parts of the roof of the device, and these are hinged to the sides in such manner that when they are opened for the purpose of filling the trough with the feed they will fall down in a way to shield the trough, in such manner that the sheep cannot have access till they are raised, and this prevents the sheep interfering until the troughs are properly filled. The roof C C also protects the interior of the device, as well as the troughs, against the entrance of snow or rain.

D D are the two sides of the hay-rack, and these are secured at their lower ends in a manner which will permit their top ends being closed together when it is desired to fill the troughs with feed.

By filling the rack with hay each sheep can be protected by the division-rails *a* of the trough while feeding from the rack, in the same manner as while feeding from the trough.

The troughs B B are pivoted at each end to the frame A, as shown at O O, and they can therefore, by drawing them in a direction out from the rack, be raised up so as to bring them upside down, and therefore an easy means is provided for emptying them when it is desired to do so.

Thus I combine in one device a means for feeding sheep from troughs and for feeding them from a hay-rick.

What I claim as new, and desire to secure by Letters Patent, is—

1. The roof C C, hinged at the outer edges, as described, so as to fall down and shut off access to the troughs while the latter are being filled with the feed, substantially as specified.

2. The manner of pivoting the troughs so that they can be emptied, substantially as specified.

M. S. EVERY.

Witnesses:
NEWCOMB BROWN,
S. D. ERRETT.